United States Patent
He et al.

(10) Patent No.: US 9,561,832 B2
(45) Date of Patent: Feb. 7, 2017

(54) FOLDABLE SCOOTER

(71) Applicants: Jing He, Bakerfield, CA (US); Hongping He, Bakersfield, CA (US)

(72) Inventors: Jing He, Bakerfield, CA (US); Hongping He, Bakersfield, CA (US)

( * ) Notice: Subject to any disclaimer, the term of this patent is extended or adjusted under 35 U.S.C. 154(b) by 0 days.

(21) Appl. No.: 14/749,641

(22) Filed: Jun. 25, 2015

(65) Prior Publication Data
US 2016/0297495 A1   Oct. 13, 2016

Related U.S. Application Data

(60) Provisional application No. 62/144,742, filed on Apr. 8, 2015.

(51) Int. Cl.
| | | |
|---|---|---|
| B62K 15/00 | (2006.01) | |
| B62M 1/36 | (2013.01) | |
| B62M 6/00 | (2010.01) | |
| B62M 6/60 | (2010.01) | |

(52) U.S. Cl.
CPC ............ B62K 15/008 (2013.01); B62K 15/006 (2013.01); B62M 1/36 (2013.01); B62M 6/00 (2013.01); B62M 6/60 (2013.01)

(58) Field of Classification Search
CPC .............................. B62K 15/006; B62K 15/008
USPC ........................................................ 280/287
See application file for complete search history.

(56) References Cited

U.S. PATENT DOCUMENTS

| | | | | |
|---|---|---|---|---|
| 4,895,386 A | * | 1/1990 | Hellestam | B62K 15/008 280/278 |
| 6,196,566 B1 | | 3/2001 | Zhang et al. | |
| 6,883,817 B2 | * | 4/2005 | Chu | B62K 15/006 280/278 |
| 7,055,842 B1 | * | 6/2006 | Lin | B62K 15/008 280/278 |
| 7,290,780 B2 | * | 11/2007 | Hsu | B62K 15/008 280/278 |
| 7,314,226 B2 | * | 1/2008 | Hsu | B62K 15/008 280/278 |
| 7,341,268 B2 | * | 3/2008 | Lin | B62K 15/008 280/278 |
| 2003/0114274 A1 | * | 6/2003 | Chang | B62K 15/008 482/57 |
| 2004/0061304 A1 | * | 4/2004 | Lim | B62H 7/00 280/278 |
| 2007/0158928 A1 | * | 7/2007 | Wu | B62K 15/008 280/278 |
| 2008/0164675 A1 | * | 7/2008 | Ma | B62K 15/008 280/287 |
| 2010/0066054 A1 | * | 3/2010 | Chen | B62K 15/008 280/278 |

OTHER PUBLICATIONS www.stigobike.com.
www.urb-e.com.

* cited by examiner

*Primary Examiner* — Joseph Rocca
*Assistant Examiner* — Michael Stabley
(74) *Attorney, Agent, or Firm* — Manuel de la Cerra

(57) ABSTRACT

A foldable scooter is disclosed with two rotational connections to the steering column, and a fixing structure that maintains the frame elements fixed relative to each other and stable when riding. Once the fixing structure is disengaged, the frame elements are free to rotate relative to each other such that the scooter can be folded into a more compact dimension.

18 Claims, 5 Drawing Sheets

FOLDABLE SCOOTER

PRIORITY

This application claim priority as the non-provisional of U.S. Patent Application Ser. No. 62/144,742 filed on Apr. 8, 2015, the entire contents of which is incorporated herein by reference.

TECHNICAL FIELD

This invention relates to foldable scooters, and more generally, to foldable and portable mobility assistance devices.

BACKGROUND

With energy independence, energy cost, and environmental concerns becoming more important every year, it is desirable to reduce the consumption of energy in every sector, including transportation, which accounts for 28 percent of energy use. Although mass transit systems are often available and can be effective at reducing cost and pollution, there are still various problems that limit consumers' willingness to travel by bus or subway instead of in their cars.

One of the most important issues affecting the widespread use of mass transit is the first mile and last mile problem. Individuals need to travel to and from the mass transit station, which is usually located some distance away from their home or workplace. To get to the bus or train station, individuals would typically need to walk or bike and spend more time or effort than they want to, or arrive there by car, often requiring a parking fee. If the individual drives or bikes from home to the station, the car or bike would typically need to be left at the station because it is not allowed on the bus or subway. The individual would still lack a way of getting from the station to the ultimate destination.

Therefore it would be desirable to have a portable personal mobility device that can take people from their homes to the station, one that is foldable and lightweight so that they can carry it with them on the mass transit vehicle, and use it again to get from the transit station to their final destination. Conventional options for bikes or seated electric scooters are generally too cumbersome and heavy to be taken onto the bus or train. While there are some lightweight options, they can take many steps to fold and unfold, which makes them less convenient for the user.

What is needed, therefore, is a small and lightweight scooter that can be easily folded and transported when not in use.

SUMMARY

A foldable scooter is provided that includes a first front wheel, a second rear wheel, a seat and a steering structure adapted to be gripped by a rider. The scooter further has a steering column, with a steering shaft disposed within the steering column, where one end of the steering shaft is connected to the first wheel and the other end of the shaft connected to the steering structure. An upper cross support member that includes a first upper segment is connected to the steering column at a first connection, and is connected to a second upper segment at a second connection. The second upper segment is also connected to the second wheel. A lower cross support member is connected to the steering column at a third connection and to the seat. The lower cross member is also connected to the second upper segment at a fourth connection. The scooter includes a fixing structure located along the upper cross support member, and has an engaged configuration and a disengaged configuration. In the engaged configuration, the fixing structure fixes the steering column, the first upper segment, the second upper segment, and the lower cross support relative to each other. In the disengaged configuration, the fixing structure allows: (1) the first upper segment and the steering column to move relative to each other about the first connection; (2) the first upper segment and the second upper segment to move relative to each other about the second connection; (3) the lower cross support and the steering column to move relative to each other about the third connection; and (4) the lower cross support and the second upper segment to move relative to each other about the fourth connection.

A second embodiment is provided wherein the lower cross support member includes a first lower segment and a second lower segment connected to each other, with a fixing structure designed to fix the movement of the first lower segment and the second lower segment relative to each other. By fixing this relative movement the entire frame of the scooter is stable and non-foldable.

These embodiments may include a latching structure that latches the first upper segment to the second upper segment (or the first lower segment to the second lower segment) such that they cannot move relative to each other. The fixing structure may be changed from the engaged to disengaged configuration by rotating the latching structure. The fixing structure may also include a pin. Either the first wheel or the second wheel or both may include a propulsion structure and a power source connected to the propulsion structure. These wheels may also have a brake. The scooter may also include foot pedals.

The foregoing summary is illustrative only and is not meant to be exhaustive. Other aspects, objects, and advantages of this invention will be apparent to those of skill in the art upon reviewing the drawings, the disclosure, and the appended claims.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

DETAILED DESCRIPTION OF EXAMPLE EMBODIMENTS

Figure 1:
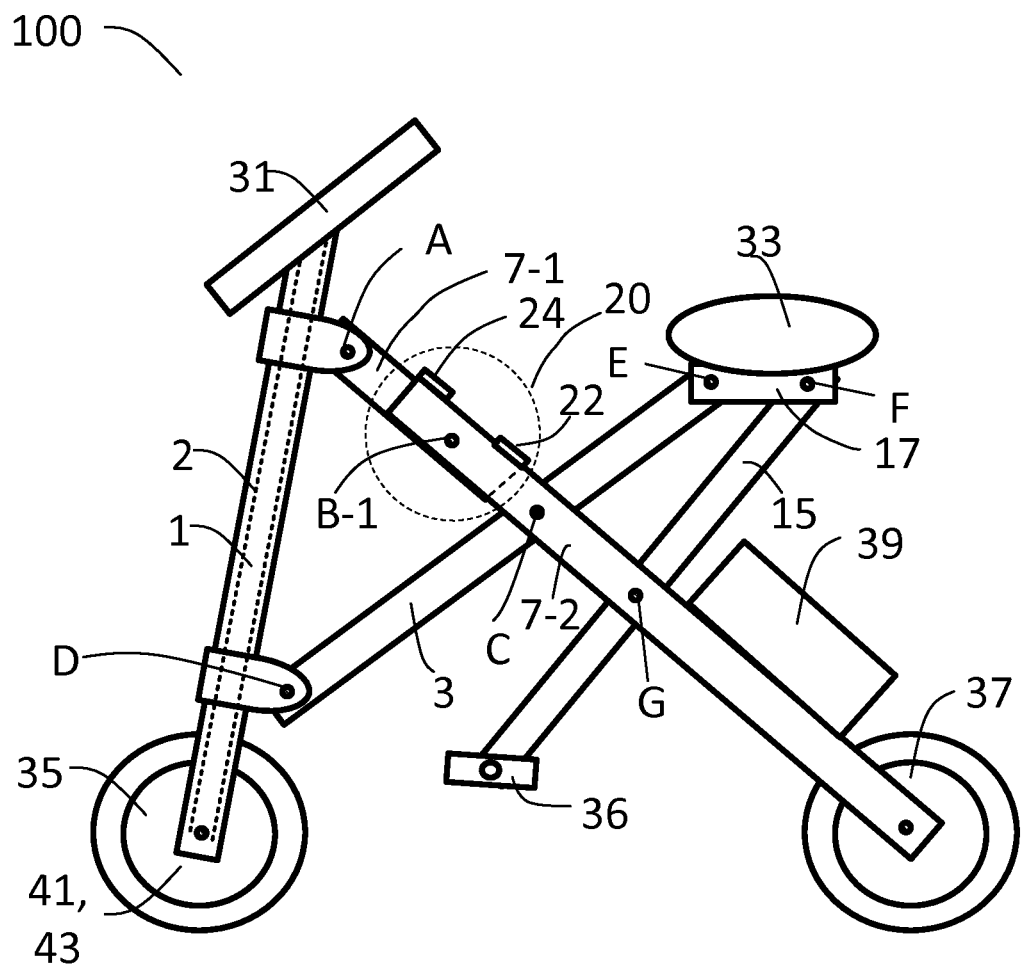
FIG. 1 is a side view of a first embodiment of a foldable scooter that is unfolded, stable and ready to ride, where the fixing structure is on the upper cross member and is in the engaged configuration.

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

In the following description, numerous specific details are set forth in order to provide a thorough understanding of the present invention. Particular example embodiments of the present invention may be implemented without some or all of these features or specific details. In other instances, components well known to persons of skill in the art have not been described in detail in order not to obscure unnecessarily the present invention.

The reference numerals and numbers refer to the following structures or features of the present disclosure
1: Steering Column
2: Steering Shaft
3: Lower Cross Support Member
3-1: First Lower Segment (FIG. 7)
3-2: Second Lower Segment (FIG. 7)
7: Upper Cross Support Member
7-1: First Upper Segment (FIGS. 1-3)
7-2: Second Upper Segment (FIGS. 1-3)
15: Seat Support Member
17: Seat Bracket
20: Fixing Structure
22: Stop
24: Latching Structure
27: Pin
31: Steering Structure
33: Seat
35: First Wheel
36: Foot Pedals
37: Second Wheel
39: Battery and Power Control
41: Propulsion Structure
43: Brake
100: Scooter (FIGS. 1-3)
100-1: Scooter (FIG. 7)
A: Rotatable connection that connects steering column 1 to first upper segment 7-1 in FIGS. 1-3 and to upper cross support member 7 in FIG. 7.
B-1: Rotatable connection that connects the first upper segment 7-1 to the second upper segment 7-2 in FIGS. 1-3.
B-2: Rotatable connection that connects the first lower segment 3-1 to the second lower segment 3-2 in FIG. 7.
C: Rotatable connection that connects the second upper segment 7-2 to the lower cross support member 3 in FIGS. 1-3, and rotatably connects upper cross support member 7 to the second lower segment 3-2 in FIG. 7.
D: Rotatable connection that connects steering column 1 to lower cross support member 3 in FIGS. 1-3, and to first lower segment 3-1 in FIG. 7.
E: Rotatable connection that connects the seat bracket 17 to the lower cross support member 3 in FIGS. 1-3, and to the second lower segment 3-2 in FIG. 7.
F: Rotatable connection that connects the seat bracket 17 to the seat support member 15.
G: Rotatable connection that connects the second upper segment 7-2 to the seat support member 15 in FIGS. 1-3, and rotatably connects the upper cross support member 7 to the seat support member 15 in FIG. 7.
H: Rotatable connection that connects the rotating latching structure 24 to the first upper segment 7-1 in FIGS. 1-6, and to the first lower segment 3-1 in FIGS. 4-7.

Figure 2:
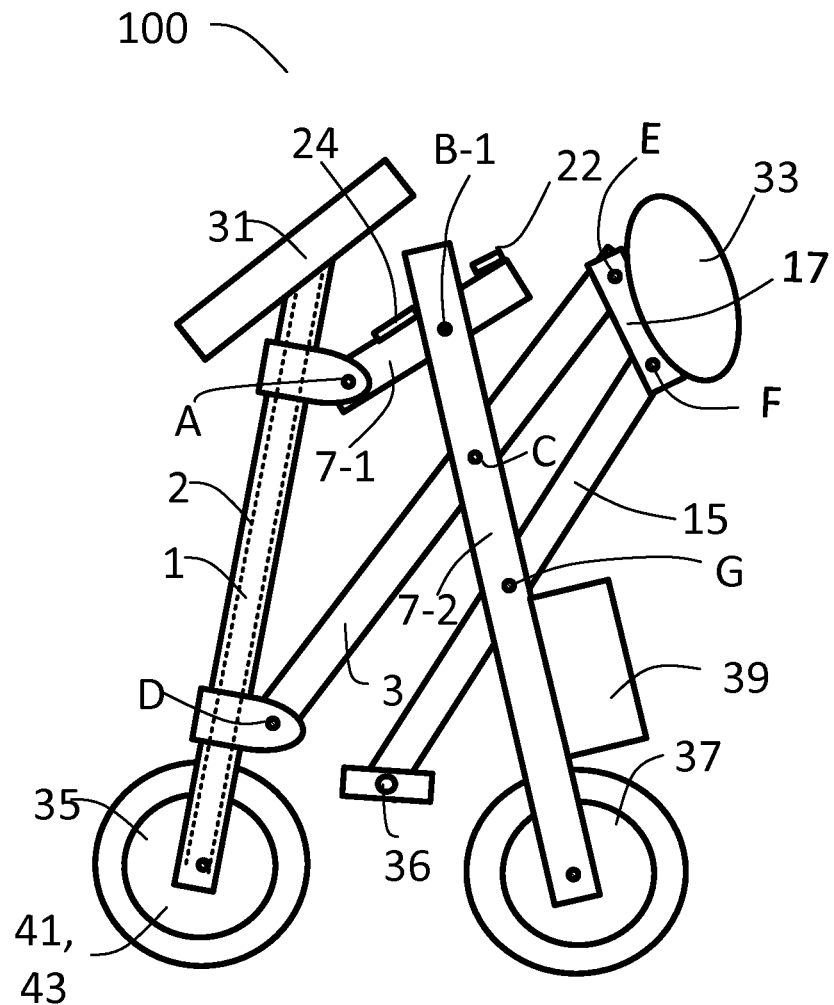
FIG. 2 shows the scooter of FIG. 1 in transition from unfolded to folded form, where the fixing structure has been released and is in the disengaged configuration.
Figure 3:
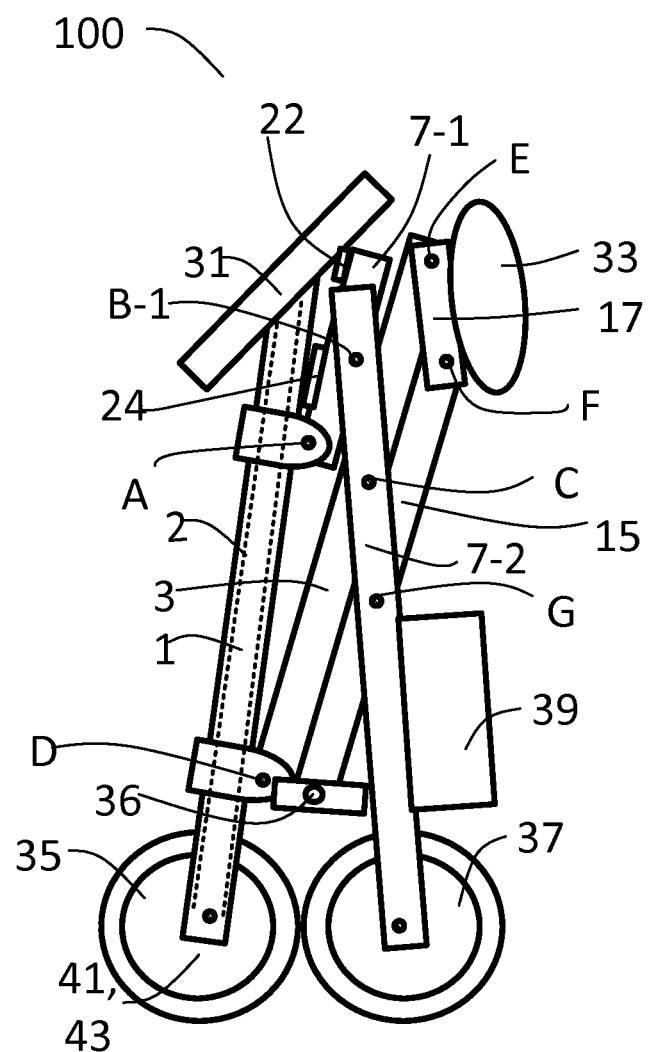
FIG. 3 shows the scooter of FIG. 1 fully folded.
Figure 4:
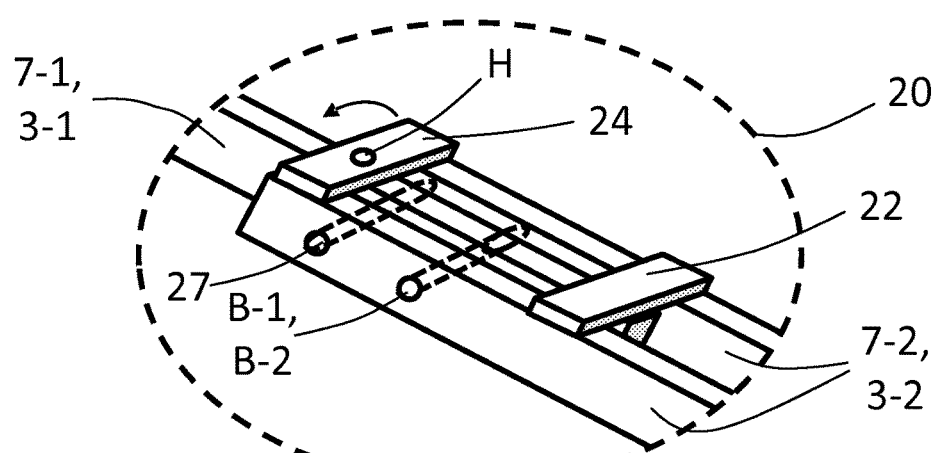
FIG. 4 illustrates an embodiment of the fixing structure in the engaged configuration, locking the various components of the frame into place as is illustrated in FIG. 1.
Figure 5:
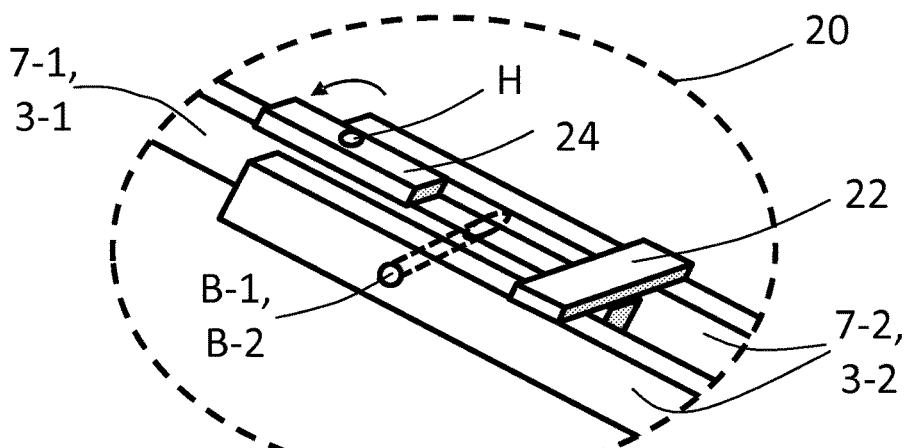
FIG. 5 illustrates the embodiment of the fixing structure in FIG. 4 in the disengaged configuration, allowing the various components of the frame to move relative to each other and fold the scooter.
Figure 6:
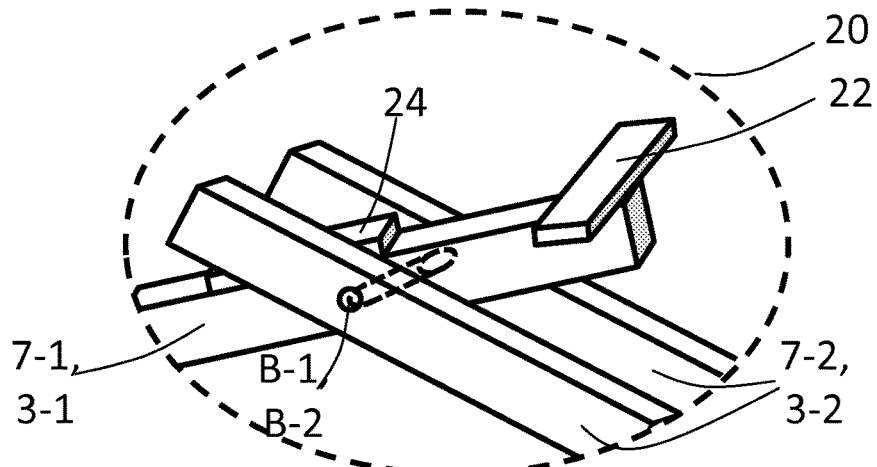
FIG. 6 illustrates the embodiment of the fixing structure in FIG. 4 in the disengaged configuration, allowing the various components of the frame to move relative to each other and fold the scooter as is illustrated in FIGS. 2 and 3.
Figure 7:
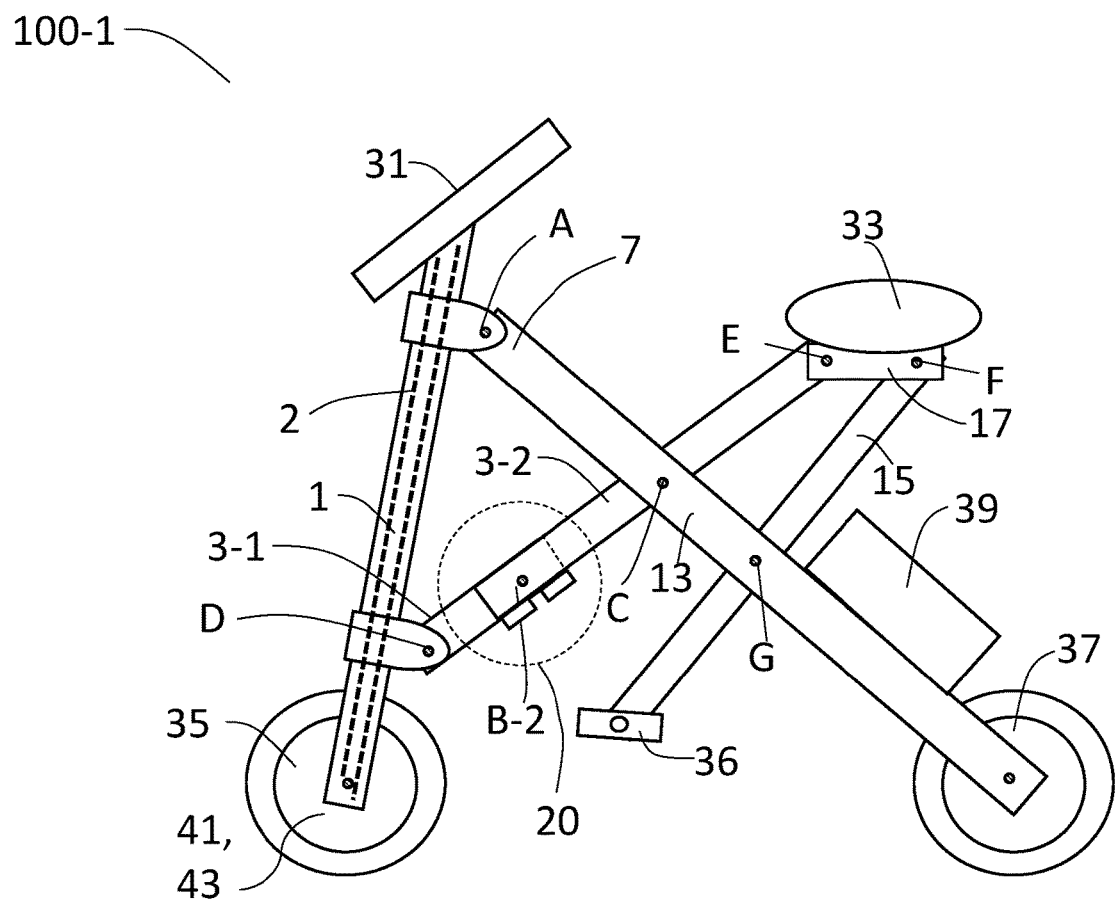
FIG. 7 is a side view of a second embodiment of a foldable scooter that is unfolded, stable and ready to ride, where the fixing structure is on the lower cross member and is in the engaged configuration.

The present invention is a foldable personal transportation vehicle that is designed to be easy to operate, lightweight, space saving and portable enough to be taken onto mass transit vehicles to solve the first and last mile problem. The structure of the frame of one embodiment is shown in FIGS. 1-3, while another embodiment is shown in FIG. 7. A common fixing structure 20 is shown in FIGS. 4-6.

FIG. 1 illustrates a first embodiment of an innovative foldable scooter 100. Steering column 1 has a steering shaft 2 disposed within. The steering structure 31 is connected to one end of the steering shaft 2, and the first front wheel 35 is connected to the other end of the steering shaft 2. This allows a rider to turn the steering structure 31 which then turns the first wheel 35 via the steering shaft 2. Because of the concentric design, the steering column 1 does not rotate when a rider is turning. The steering structure 31 may be handle bars, a steering wheel or other appropriate structure.

The first wheel 35 (and/or the second rear wheel 37) may comprise more than one wheels and can also include a propulsion structure 41 such as an electric or gas powered motor that propels the scooter 100. The battery and power control 39 may be included to control the propulsion device 41. Although this is shown mounted on the rear of the scooter 100, it would be apparent to those in the art that the precise location of the battery and power control need not be so limited, such that it may be placed on the scooter so as to more evenly distribute weight. A throttle may be included on the steering structure 31 or on the foot pedal 36. The steering structure 31 or the foot pedal 36 may also include a brake 43 to stop the scooter 100.

Connected to the steering column 1 at connection point A is the upper cross support member comprised of a first upper segment 7-1 and a second upper segment 7-2. This connection point allows for the relative rotational movement of the first upper segment 7-1 to the steering column 1. Also rotationally connected to the steering column 1 is the lower cross support member 3 at connection point D. Again, this connection point allows for rotational movement. The relative positions of upper and lower refer to the connection position on the steering column 1.

The first upper segment 7-1 is rotationally connected to the second upper segment 7-2 at connection point B-1. While this connection also permits rotational movement, when the scooter 100 is in the riding configuration (as in FIG. 1) the first and second upper segment (7-1, 7-2) are fixed relative to each other by fixing structure 20, described in more detail with reference to FIGS. 4-6. The second upper segment 7-2 is also connected to the second wheel 37.

The lower cross support member 3 is also rotationally connected to the second segment 7-2 at position C, and is further connected to the seat bracket 17 at connection point E. The seat 33 is attached to the bracket 17. Also shown is an optional seat support member 15 that connects to the seat bracket 17 at rotational connection F and the second upper segment at rotational connection G. The seat support members' 15 end opposite to the seat bracket 17 may further include a foot pedal 36. The seat support member 15 is not required and may be omitted. In such a design, the seat 33 may be attached to the end of the lower cross support member 3.

When the scooter 100 is in use, the fixing structure 20 locks the connection B-1 fixing segment 7-1 to segment 7-2, so that connections AB-1 and B-1C effectively form connection AC, which makes AC a fixed distance. And since AC is now a fixed length, and AD and CD are both fixed lengths, then the triangle ACD is a stable structure. Because ACD is fixed, and its vertical angle, ECG, is also fixed and makes the quadrilateral CEFG, supporting the seat 33 and foot pedal 36, stable and non-foldable. The scooter 100 is then safe and reliable for riding.

To fold the scooter 100, the fixing structure 20 is disengaged by turning the rotating latch 24, while the seat 33 is lifted towards its front end close to the connection E. Disengaging the fixing structure 20 causes the angle ACD to be no longer fixed, and AB-1 and B-1C no longer constrained to a fixed distance AC. Triangle ACD is free to become the quadrilateral AB-1CD, and similarly the quadrilateral CEFG is free to change its shape. The quadrilaterals AB-1CD and CEFG can flatten and fold forward, as shown in FIG. 2.

FIG. 3 shows the structure of the scooter 100 in its folded position. The first wheel or wheels 35 may touch the second wheel or wheels 37. The quadrilateral AB-1CD is at its smallest here, with the angle AB-1C determined by the distance between the first wheel or wheels 35 and the second wheel or wheels 37. The lower cross support member 3 and the seat support member 15 are in contact with one another, as the quadrilateral CEFG may be completely flattened, with the seat 33 resting vertically when the scooter 100 is completely folded. The frame may also be locked into its folded position with the fixing structure 20, so the scooter 100 may be pushed or pulled like a piece of luggage. As another function while fully folded, the scooter 100 may also serve as a walker because a person may support his or her weight on the steering structure, which may be handlebars, 31 for stability as he or she walks forward.

A possible implementation of the fixing structure 20 is illustrated in FIGS. 4-6. The fixing structure 20 fixes the first and second upper segment (7-1, 7-2) at the rotational connection B-1. There is provided a stationary piece or stop 22 attached to first upper segment 7-1 that is fixed to be perpendicular to segment 7-1, and fits snugly over the top of the second upper segment 7-2 to prevent the second segment 7-2 from moving in the counterclockwise direction and to prevent the first upper segment 7-1 from moving in the clockwise direction. There is also a rotating latching structure 24 attached to first upper segment 7-1 some distance away from the stop 22 that, when turned so that it is perpendicular to segment 7-1, engages or locks the fixing assembly 20 by preventing the movement of first upper segment 7-1 in the counterclockwise direction, as well as preventing the movement of second upper segment 7-2 in the clockwise direction. The rotating latching structure 24 is fitted to first upper segment 7-1 through rotational connection H, and when turned so that the latching structure 24 is perpendicular to the first upper segment 7-1, as seen in FIG. 4, the segments (7-1 and 7-2) are prevented from moving relative to one another, and the fixing structure 20 is considered to be engaged or locked.

When the rotating latching structure 24 is turned so that it is parallel to the first upper segment 7-1, as in FIG. 5, the fixing structure 20 is disengaged or unlocked, and the first upper segment 7-1 is free to move in the counterclockwise direction while the second upper segment 7-2 is free to move in the clockwise direction, which is shown in FIG. 6. This movement allows the scooter 100 to fold forward, as seen in FIGS. 2 and 3. When the first upper segment 7-1 is rotated even further than is shown in FIG. 6, such that the rotational latch structure 24 clears the second upper segment 7-2, the rotational latching structure 24 can once again be rotated such that is its perpendicular to the first upper segment 7-1, thereby locking the scooter 100 in place while it is folded so that it will stay folded until it is unlocked.

The fixing structure 20 may also be a pin 27 shown in FIG. 4 that is disposed of in aligned holes in the first upper segment 7-1 and the second upper segment 7-2. This pin 27 may be removed, allowing the rotation of the first upper segment 7-1 relative to the second upper segment 7-2.

FIG. 7 illustrates a second embodiment of a foldable scooter 100-1. Many of the features are the same as in the embodiment already detailed above. The main difference is that scooter 100-1 has an upper cross support member 7 instead of the first and second upper segments connected at connection point B-1. The other difference is that the lower cross support member is now comprised of a first lower segment 3-1 and a second lower segment 3-2 connected at connection point B-2. These two lower segments (3-1 and 3-2) may be fixed relative to each other by fixing structure 20, already described above.

When the scooter 100-1 is in use, the fixing structure 20 locks the connection B-2 connecting segment 3-1 to segment 3-2, so that connections DB-2 and B-2C effectively form connection DC, which makes DC a fixed distance. And since DC is now a fixed length, and AD and AC are both fixed lengths, then the triangle ACD is a stable structure. Because ACD is fixed, and its vertical angle, ECG, is also fixed and makes the quadrilateral CEFG, supporting the seat 33 and foot pedals 36, is stable and non-foldable. The scooter 100-1 is then safe and reliable for riding.

To fold the scooter 100-1, the fixing structure 20 is disengaged by turning the rotating latch 24, while the seat 33 is lifted towards its front end close to the connection E. Disengaging the fixing structure 20 causes the angle ACD to be no longer fixed, and DB-2 and B-2C no longer constrained to a fixed distance DC. Triangle ACD is free to become the quadrilateral ACB-2D, and similarly the quadrilateral CEFG is free to change its shape. The quadrilaterals ACB-2D and CEFG can flatten and fold forward.

The invention has been described in connection with specific embodiments that illustrate examples of the invention but do not limit its scope. Various example systems have been shown and described having various aspects and elements. Unless indicated otherwise, any feature, aspect or element of any of these systems may be removed from, added to, combined with or modified by any other feature, aspect or element of any of the systems. As will be apparent to persons skilled in the art, modifications and adaptations to the above-described systems and methods can be made without departing from the spirit and scope of the invention, which is defined only by the following claims. Moreover, the applicant expressly does not intend that the following claims "and the embodiments in the specification to be strictly coextensive." *Phillips v. AHW Corp.*, 415 F.3d 1303, 1323 (Fed. Cir. 2005) (en banc).

The invention claimed is:

1. A foldable scooter comprising:
   a first wheel;
   a second wheel;
   a seat;
   a seat bracket;
   a steering structure adapted to be gripped by a rider;
   a steering column, with a steering shaft disposed within the steering column, one end of the steering shaft connected to the first wheel and the other end of the shaft connected to the steering structure;
   an upper cross support member comprised of a first upper segment and a second upper segment, wherein the first upper segment is connected to the steering column at a first connection, and connected to the second upper segment at a second connection, wherein the second upper segment is connected to the second wheel;
   a lower cross support member connected to the steering column at a third connection, connected to the second upper segment at a fourth connection, and connected to the seat bracket at a fifth connection;
   a seat support member connected to the seat bracket at a sixth connection and connected to the second upper segment at a seventh connection;
   a fixing structure located along the upper cross support member, the fixing structure having at least two configurations:
      an engaged configuration that fixes the steering column, the first upper segment, the second upper segment, and the lower cross support relative to each other, and fixes the seat support member and the second upper segment relative to each other;
      a disengaged configuration that allows:
         the first upper segment and the steering column to move relative to each other about the first connection;
         the first upper segment and the second upper segment to move relative to each other about the second connection;
         the lower cross support and the steering column to move relative to each other about the third connection;
         the lower cross support and the second upper segment to move relative to each other about the fourth connection;
         the seat support member and the second upper segment can move relative to each other about the seventh connection.

2. The scooter of claim 1, wherein the fixing structure comprises a latching structure that latches the first upper segment to the second upper segment such that they cannot move relative to each other.

3. The scooter of claim 2, where the fixing structure is changed from the engaged to disengaged configuration by rotating the latching structure.

4. The scooter of claim 1, wherein the first upper segment and the second upper segment each have a hole that is aligned when the fixing structure is in the engaged position, the fixing structure further comprising a pin disposed of in the aligned holes.

5. The scooter of claim 1, further comprising a propulsion structure connected to either the first wheel or the second wheel or both wheels.

6. The scooter of claim 5, further comprising a power source connected to the propulsion structure.

7. The scooter of claim 1, further comprising a brake connected to either the first wheel or the second wheel or both wheels.

8. The scooter of claim 1, wherein either the first wheel or the second wheel comprises at least two wheels.

9. The scooter of claim 1, further comprising foot pedals.

10. A foldable scooter comprising:
    a first wheel;
    a second wheel;
    a seat;
    a steering structure adapted to be gripped by a rider;
    a steering column, with a steering shaft disposed within the steering column, one end of the steering shaft connected to the first wheel and the other end of the shaft connected to the steering structure;
    a lower cross support member comprised of a first lower segment and a second lower segment, wherein the first lower segment is connected to the steering column at a first connection, and connected to the second lower segment at a second connection;
    an upper cross support member connected to the steering column at a third connection and the second wheel, wherein the upper cross member is connected to the second lower segment at a fourth connection;
    a seat bracket connected to the second lower segment at a fifth connection;
    a seat support member connected to the seat bracket at a sixth connection and connected to the upper cross member at a seventh connection;
    a fixing structure located along the lower cross support member, the fixing structure having at least two configurations:
       an engaged configuration that fixes the steering column, the first lower segment, the second lower segment, and the upper cross support relative to each other, and fixes the seat support member and the second lower segment relative to each other;
       a disengaged configuration that allows:
          the first lower segment and the steering column to move relative to each other about the first connection;
          the first lower segment and the second lower segment to move relative to each other about the second connection;
          the upper cross support and the steering column to move relative to each other about the third connection;
          the upper cross support and the second lower segment to move relative to each other about the fourth connection;
          the seat support member and the second lower segment to move relative to each other about the seventh connection.

11. The scooter of claim 10, wherein the fixing structure comprises a latching structure that latches the first lower segment to the second lower segment such that they cannot move relative to each other.

12. The scooter of claim 11, where the fixing structure is changed from the engaged to disengaged configuration by rotating the latching structure.

13. The scooter of claim 10, wherein the first lower segment and the second lower segment each have a hole that is aligned when the fixing structure is in the engaged position, the fixing structure further comprising a pin disposed of in the aligned holes.

14. The scooter of claim 10, further comprising a propulsion structure connected to either the first wheel or the second wheel or both wheels.

15. The scooter of claim 14, further comprising a power source connected to the propulsion structure.

16. The scooter of claim 10, further comprising a brake connected to either the first wheel or the second wheel or both wheels.

17. The scooter of claim 10, wherein either the first wheel or the second wheel comprises at least two wheels.

18. The scooter of claim 10, further comprising foot pedals.

\* \* \* \* \*